United States Patent [19]

Kubo

[11] Patent Number: 4,650,362

[45] Date of Patent: Mar. 17, 1987

[54] BALL JOINT

[75] Inventor: Kanji Kubo, Kanagawa, Japan

[73] Assignee: Honda Giken Kogyo Kabushiki Kaisha, Tokyo, Japan

[21] Appl. No.: 868,806

[22] Filed: May 29, 1986

[30] Foreign Application Priority Data

Jun. 3, 1985 [JP] Japan .............................. 60-83772[U]

[51] Int. Cl.$^4$ .......................... F16C 11/00; F16D 1/12
[52] U.S. Cl. .................................... 403/134; 403/114; 403/51; 277/212 FB
[58] Field of Search ................... 403/134, 50, 51, 163, 403/113, 114; 277/212 FB

[56] References Cited

U.S. PATENT DOCUMENTS 4,195,862 4/1980 Specktor et al. ..................... 280/661
4,220,418 9/1980 Kondo et al. ................... 403/134 X
4,304,416 12/1981 Oshima ......................... 277/212 FB Primary Examiner—Andrew V. Kundrat
Attorney, Agent, or Firm—Irving M. Weiner; Joseph P. Carrier; Pamela S. Burt

[57] ABSTRACT

A ball joint (9) for mutually rotatably interconnecting two members (12, 5), the ball joint (9) including a ball shaft (35) attached to one member (12) out of the aforesaid two members, the ball shaft (35) having at one end thereof a ball (34) rotatably accommodated in a housing (31) attached to the other member (5) out of the aforesaid two members, and a dust boot (50) fitted on the ball shaft (35) to surround the ball shaft (35), the dust boot (50) being fixedly attached at one end thereof to the housing (31) and formed at the other end thereof with a seal lip (54) adapted to come into elastic contact with the aforesaid one member (12). The dust boot (50) has formed thereon a projected portion (53) surrounding the seal lip (54) and facing the side of the aforesaid one member (12) so that a labyrinth (S) defined between the projected portion (53) and the aforesaid one member (12).

8 Claims, 5 Drawing Figures

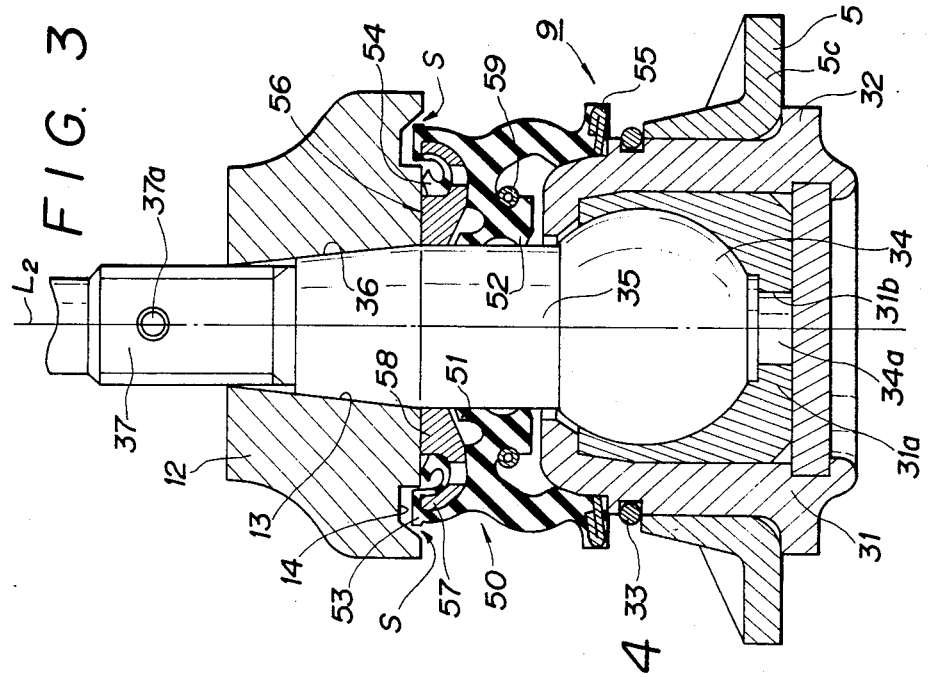
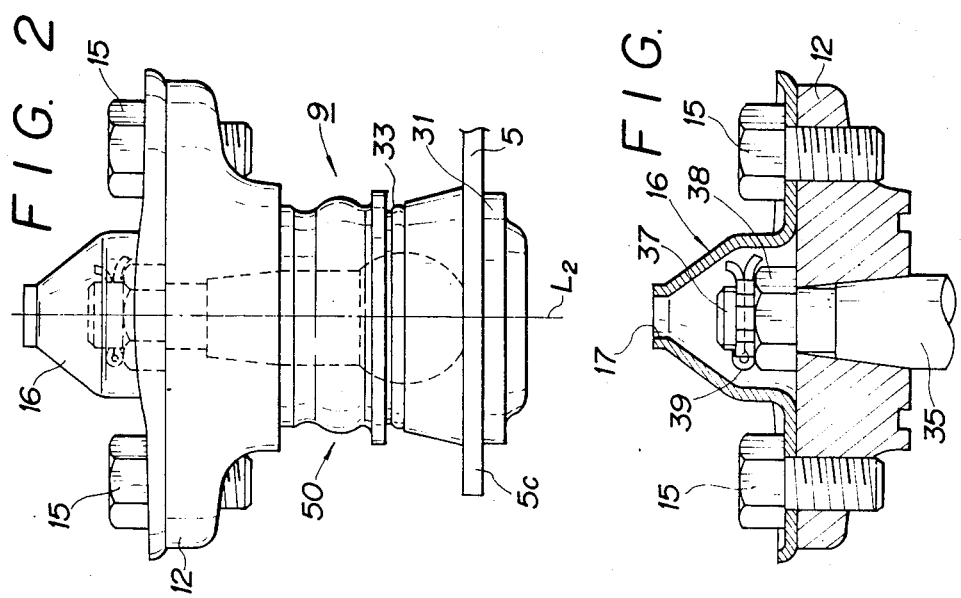
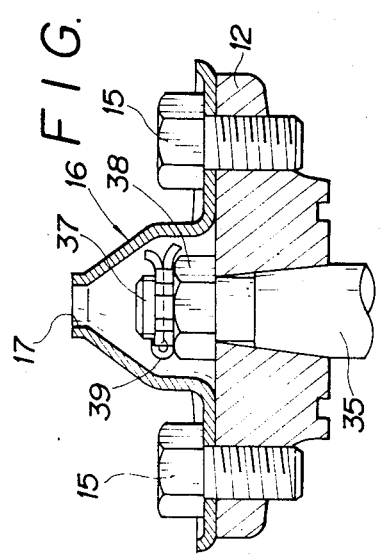

BALL JOINT

BACKGROUND OF THE INVENTION

1. Field of the Invention

The present invention generally relates to a ball joint. More particularly, the invention relates to a ball joint that is suitable for use in an independent suspension for vehicles.

2. Description of Relevant Art

In general, as a joint for connecting two members to each other, universal joints, ball joints and the like are known.

Among such joints, ball joints are constituted in the form of a joint consisting of a ball shaft having a ball formed at the distal end thereof, the ball shaft being attached to one of two members to be interconnected with each other by the joint, and a ball housing accommodating the ball therein, the ball housing being attached to the other member.

Further, in recent years, in the field of suspensions for vehicles, particulary of independent suspensions, there have been provided ball joint type independent suspensions employing ball joints in place of king pins which had been ordinarily employed.

As an example of conventional ball joints in such ball joint type independent suspensions, there is shown in FIG. 5 a ball joint 100 of such a type that a ball housing and a ball are adapted to be rotatable relative to each other only about the axis of a ball shaft, to thereby achieve advantages in relation to the provision of sealing measures and endurability. The ball joint 100 employs a sealing structure including a dust boot 105 that is stretched between a member 103 at one side, to which a shaft portion 102 of a ball 101 is fixed, and a housing 104 attached to an unshown member at the other side, so as to cover the shaft portion 102. Incidentally, in FIG. 5, upward and downward directions thereof correspond to frontward and rearward directions of a vehicle (not shown).

The dust boot 105 is fixedly attached at the rear end (lower end in FIG. 5) thereof with a stop ring 108 embedded therein to the outer circumference of the front part of the housing 104, and has at the front end (upper end in FIG. 5) thereof a portion fitted along the inner circumference thereof on the shaft portion 102. In this front end portion is embedded an annular core member 107, while a frontwardly directed annular seal lip 106 is formed on such an outer circumferential pat of the front end portion of the dust boot 105 that faces the side of the member 103 to which the shaft portion 102 is fixed. Incidentally, in FIG. 5, designated at reference number 104a is a ball collar fitted tight so as to adapt the ball 101 to be rotatable, only about the axis of the shaft portion 102 thereof, with respect to the housing 104. Moreover, practically, the one side member 103 is a knuckle arm in a suspension, and the other side member that the housing 104 is attached to is an upper arm or a lower arm of the suspension.

By such arrangement of the ball joint 100 as described above, the one side member 103 that the shaft porton 102, as a ball shaft, is attached to is adapted to be rotatable, relative to the other side member that the housing 104 is attached to, about the axis of the ball shaft.

However, the seal lip 106 of the dust boot 105 is adapted to merely come into elastic contact with the one side member 103 due to the flexibility thereof. In this respect, since the ball joint 100 is disposed in the vicinity of a wheel in the suspension of the vehicle, the seal lip 106 is likely to catch dust or pebbles, thus raising a problem such that the sealability of the ball 101 may be reduced. Particularly, as the seal lip 106 is deteriorated with the time, such problem becomes remarkable, resulting in the possibility that a problem may arise in regard to the operability and/or endurability of the ball joint 100.

With such points in mind, the present invention has been achieved to effectively solve problems in conventional ball joints.

SUMMARY OF THE INVENTION

An object of the present invention is to provide a ball joint in which the sealability of a seal lip of a dust boot to a ball can be sufficiently secured, and which is improved in endurability.

To achieve such object, the present invention provides a ball joint for mutually rotatably interconnecting two members, the ball joint comprising a ball shaft provided with a ball at one end thereof and attached to one member out of the aforesaid two members, a housing attached to the other member out of the aforesaid two members and adapted for rotatably accommodating the ball therein, and a dust boot fitted on the ball shaft to surround the ball shaft, the dust boot having at the side of the aforesaid other member an end portion stoppedly attached to the housing and at the side of the aforesaid one member and end portion formed with a seal lip adapted to surround the ball shaft and to come into elastic contact with the aforesaid one member, wherein the dust boot has formed thereon a projected portion surrounding the seal lip and facing the side of the aforesaid one member so that a labyrinth is defined between the projected portion and the aforesaid one member.

The above and further features, objects, and advantages of the present invention will more fully appear from the following detailed description of the preferred embodiment of the invention when the same is read in conjunction with the accompanying drawings.

BRIEF DESCRIPTION OF THE DRAWINGS

FIG. 2 is a schematic plan view of the entirety of the ball joint.

FIG. 3 is an enlarged horizontal sectional view of an intermediate portion and a rear portion of the ball joint.

FIG. 4 is an enlarged horizontal sectional view of a front portion of the ball joint.

DETAILED DESCRIPTION OF THE PREFERRED EMBODIMENT

Figure 5:
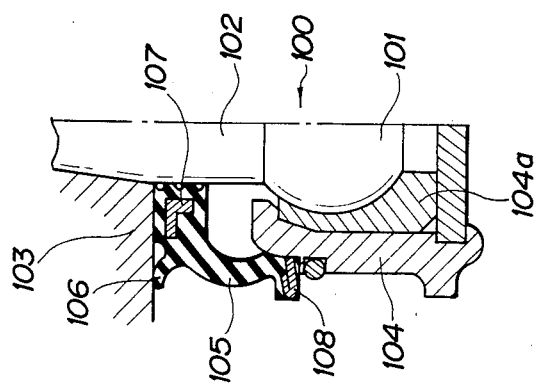
FIG. 5 is a horizontal sectional view of a conventional ball joint, as described.
Figure 1:
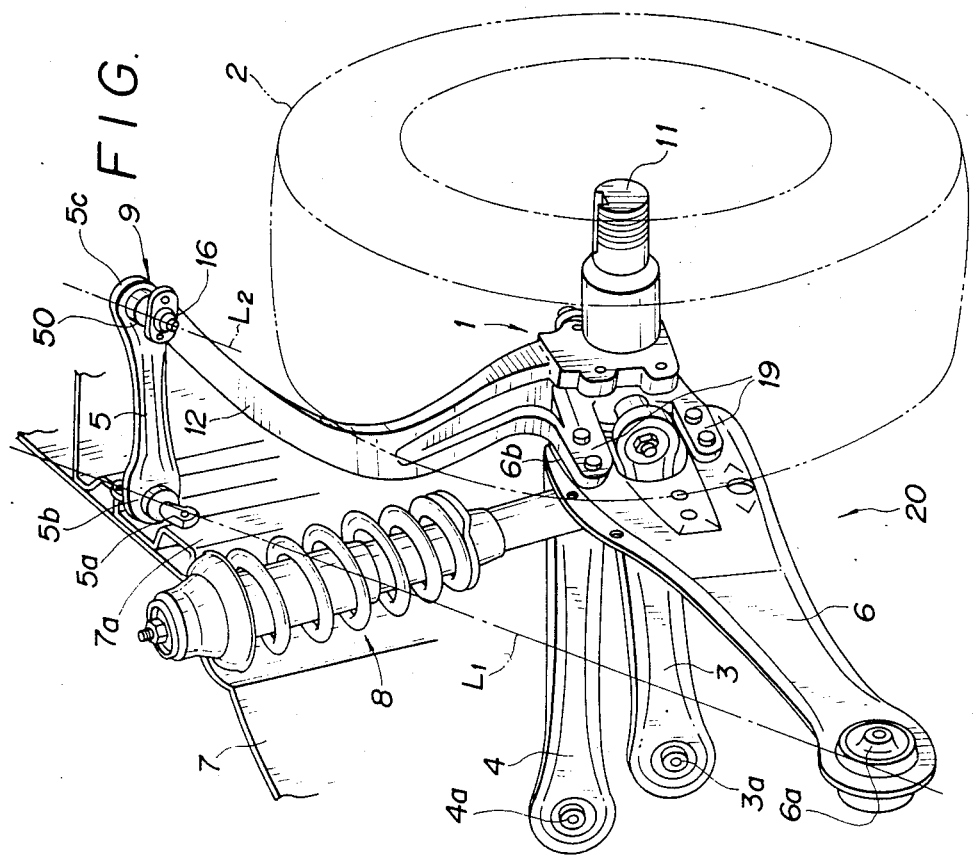
FIG. 1 is a view of a rear independent suspension of a vehicle, as it is seen from the front of the vehicle at a transversely inclined angle, the suspension employing a ball joint according to a preferred embodiment of the present invention.

Referring first to FIG. 1, designated at reference number 20 is a rear independent suspension of a vehicle (not shown) that employs a ball joint 9 according to a preferred embodiment of the present invention. FIG. 1 is a perspective view of the suspension 20, as it is seen from the transverse front of the vehicle.

The suspension 20 includes a knuckle 1. Of the knuckle 1, the lower part has on the transversely outer side face thereof an axle 11 projected therefrom to rotatably support a wheel 2, and at the front and rear sides thereof a pair of lower arms 3, 4 pivotably connected thereto, respectively. Moreover, on the upper part of the knuckle 1 there is integrally extendedly provided an arm portion 12, which is rearwardly and transversely inwardly curved and with the upper end of which an upper arm 5 is pivotably interconnected through a ball joint 9. Further, on the front part of the knuckle 1 there is formed a bifurcate portion 19 projecting therefrom, which portion 19 is fastened by bolting to a bifurcate portion 6b in the rear part of a trailing arm 6 configured in a plate form having both faces thereof vertically directed. By such arrangement, the knuckle 1 is firmly united with the trailing arm 6.

In the foregoing arrangement, the trailing arm 6 comprises a plate spring member which is highly rigid in the plate face direction and sufficiently elastic in the plate thickness direction. The lower arms 3, 4 are vertically swingably pivoted at pivot points 3a, 4a thereof on a vehicle body frame (not shown), respectively. The upper arm 5 has a swing pivot 5a thereof fixed to a bracket 7a in a wheel house 7 provided at the vehicle body side. Between the lower part of the knuckle 1 and the vehicle body there is interoposed a hydraulic shock absorber 8.

The rear independent suspension 20 is constituted such that the trailing arm 6 has at the vehicle body side a pivot point 6a thereof coincident with the centerline $L_1$ of the swing pivot 5a, that is, with the swing centerline at the vehicle body side pivot part of the upper arm 5. Furthermore this centerline $L_1$ is in parallel with the axis line $L_2$ of the ball joint 9, that is, with the swing centerline at the knuckle side of the upper arm 5.

As described, the trailing arm 6 is firmly united with the knuckle 1 and, therefore, the knuckle 1 is adapted to integrally rotate with the trailing arm 6 about the vehicle body side pivot point 6a of the trailing arm 6. Moreover, since the vehicle body side pivot point 6a of the trailing arm 6 is located on the vehicle body side swing centerline $L_1$ of the upper arm 5, it so follows that a triangular plane 6a-5a-5c to be defined by connecting the vehicle body side pivot point 6a of the trailing arm 6, a pivot point 5b of the upper arms at the vehicle body side, and another pivot point of this arm 5 at the knuckle side is adapted to swing about the swing centerline $L_1$ at the vehicle body side of the upper arm 5. Accordingly, those relative angle variations between the upper arm 5 and the arm portion 12 of the knuckle 1 which are attendant on vertical movements of the wheel 2 are limited within a small range. In other words, those rotary motions which take place in the body of the ball joint 9 interposed between the knuckle 1 and the upper arm 5 are possibly restricted.

Further, the axis line $L_2$ of the ball joint 9 parallel with the vehicle body side swing centerline $L_1$ of the upper arm 5 so that the rotary motions in the body of the ball joint 9 take place substantially about nothing but the axis line $L_2$ of the joint 9. Therefore, the independent suspension 20 itself is given in the form of a suspension system that is extremely excellent for the sealing purpose of a ball joint, as well as in endurability and cost.

Hereafter, with reference to FIGS. 2 to 4, description will be made of the ball joint 9 as a preferred embodiment of the present invention. Incidentally, in FIGS. 2 to 4, upward and downward directions thereof correspond to frontward and rearward directions of the vehicle, respectively.

FIG. 2 is a plan view of the ball joint 9, and FIG. 3 is an enlarged horizontal sectional view of the ball joint 9.

The ball joint 9 includes a housing 31 in which a ball 34 is assembled. The housing 31 is fixed along the outer circumference of the intermediate part thereof to the upper arm 5 by means of a circle clip 33 cooperating with a flange 32 formed on the outer circumference of the lower part of the housing 31 itself. In FIG. 3, designated at reference number 31a is a ball collar that is fitted tight so as to adapt the ball 34 to be rotatable, only about the axis of a ball shaft 35 as a shaft portion thereof, with respect to the housing 31. In this respect, the ball 34 has on the rear face thereof a shaft 34a projected therefrom so as to be coaxial with the ball shaft 35. The projected shaft 34a cooperates with a correspondent recess 31b of the collar 31a to thereby permit the ball 34 to rotate about nothing but the axis of the shaft portion 35 thereof, that is, the axis line $L_2$ of the ball joint 9.

On the other hand, the ball shaft 35, which is integrally formed with the ball 34, has along the intermediate part thereof a tapered surface 36 formed thereon. The surface 36 is fitted in a tapered insertion hole 13 opened through the arm portion 12 of the knuckle 1. Moreover, the top part of the ball shaft 35 is formed as a threaded portion 37 on which, as shown in FIG. 4, a crown nut 38 is screwed to be fastened. The nut 38 is checked from rotation by means of a split or cotter pin 39 inserted through a pin hole 37a of the threaded portion 37. The crown nut 38 is screwed to be fitted on the upper end part of the threaded portion 37, which is further covered with a cap-like cover 16 secured by bolts 15 to the front (in the longitudinal direction of the vehicle body) side of the arm portion 12 of the knuckle 1. By the virtue of the cover 16, effective protection is made of the threaded portion 37, the crown nut 38, and the split pin 39. Incidentally, the cover 16 is formed with a drain hole 17. In this respect, in a mounted position of the ball joint 9, the drain hole 17 downdardly inclined as shown in FIG. 1.

In addition to the foregoing arrangement, the ball joint 9 comprises a tubular flexible dust boot 50 fitted on the ball shaft 35 so as to surround same, thus covering the section between the housing 31 and the knuckle arm portion 12. The dust boot 50 has at the rear end part thereof a stop ring 55 embedded therein for airtightly attaching the whole circumference of the rear end part of the boot 50 to the housing 31 in a stopping manner, and at the front end part thereof an annular core member 56 partially embedded therein to be fitted on the outer circumference of the ball shaft 35. Moreover, at the intermediate part of the dust boot 50, on the inner circumference thereof are formed a pair of inner annular seal lips 51, 52 axially spaced apart from each other. The seal lips 51, 52 are brought into elastic contact with the outer circumference of the base part of the ball shaft 35. Further, at the outside of the seal lips 51, 52, there is provided a tightening spring 59.

The dust boot 50 has formed on the front part thereof an annular projected portion 53 axially projecting to cover a projection 57 formed on the outer circumference of the annular core member 56. Then, the annular projected portion 53 has formed at the inner circumference side thereof a front annular seal lip 54 that is adapted to surround the whole circumference of an inner base portion 58 of the annular core member 56, thus surrounding the whole circumference of the ball shaft 35, and brought into elastical contact with the knuckle arm portion 12. Thus, the whole circumference of the annular seal lip 54 is surrounded by the annular projected portion 53 of the dust boot 50.

On the other hand, in the rear face of the knuckle arm portion 12 that the annular projected portion 53 of the dust boot 50 faces, there is formed an annular recess 14 in which the annular projected portion 53 is loose-fitted, with a predetermined gap left therebetween.

With such arrangement, the rear end part of the dust boot 50 is adapted to be fixedly attached by the stop ring 55 to the outer circumference of the front part of the housing 31 and to be fitted, through the annular core member 56 in the front part of the boot 50, on the outer circumference of the base part of the ball shaft 35. Moreover, in an assembled state of the ball joint 9, the front annular seal lip 54 and the front face of the annular core member 56 are brought into contact under pressure with the rear face of the knuckle arm portion 12. Then, the inner annular seal lips 51, 52 are elastically brought into contact with the outer circumference of the ball shaft 35. And, between the annular projected portion 53 of the front part of the dust boot 50 and the annular recess 14 of the rear face of the knuckle arm portion 12 that the annular projected portion 53 faces, there is defined a narrow labyrinth S.

Further, of the annular seal lips 51, 52 formed on the inner circumference of the dust boot 50, the front one 51 is adapted to serve as a main lip, and the rear one 52, as a grease seal for the housing 31. On the other hand, the annular seal lip 54 formed on the inner circumference of the front part of the dust boot 50 is adapted to serve as a dust seal. The inner base portion 58 of the annular core member 56 is adapted to centering the dust boot 50, while functioning as a bearing relative to the ball shaft 35, and concurrently is intended to serve also as a dust seal of the ball shaft 35 itself.

As will be understood from the foregoing description, in the ball joint 9 according to the present invention, the annular projected portion 53 is formed so as to surround the whole circumference of the seal lip 54 at the front end part of the dust boot 50, and is located at the outside of the seal lip 54. Also the labyrinth S is defined by the annular projected portion 53 and the annular recess 14 of the knuckle arm portion 12. Accordingly, by the labyrinth S being located between the seal lip 54 and the outside of the dust boot 50, it is permitted to prevent the intrusion of foreign matter such as pebbles into the ball joint 9, and particularly to prevent pebbels and the like from being caught at the seal lip 54. This function is very desirable because the ball joint is disposed in the vicinity of the wheel 2, where it is exposed to a great deal of foreign matter. Besides, in the annular projected portion 53 cooperating with the annular recess 14 to define the labyrinth S, there is inlaid the projection 57 that is formed on the outer circumference of the annular core member 56. As a result, due to the reinforcing effect of the core member 56, the labyrinth S is favorably permitted to keep a configuration thereof from being deformed with the time, thus successfully achieving continued exhibition of the preventive effect against foreign matter intrusion. In other words, the sealability and endurability of the seal lip 54 is greatly improved.

Incidentally, in the foregoing embodiment, the annular recess 14 that corresponds to the the annular projected portion 53 of the dust boot 50 is formed in the knuckle arm portion 12, to thereby define the labyrinth S. In this respect, the annular projected portion 53 may be configured so as to cooperate with the rear face of the knuckle arm portion 12 to have a proper gap as a labyrinth defined therebetween, without forming the annular recess 14 or the like.

Moreover, the seal lip 54, the projected portion 53, and the recess 14 are not necessarily limited to be of an annular form, but they may be of any other stuitable form such as a regular hexagon.

Further, although in the foregoing embodiment the present invention is applied to a ball joint of a ball joint type rear independent suspension, it will be understood that the invention may be applied to any arbitrary ball joint that is intended to mutually rotatably unite two members with each other.

Although there has been described what is at present considered to be the preferred embodiment of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

I claim:

1. A ball joint (9) for mutually rotatably interconnecting two members (12, 5), said ball joint (9) comprising:
   a ball shaft (35) provided with a ball (34) at one end thereof and attached to one member (12) out of said two members;
   a housing (31) attached to the other member (5) out of said two members and adapted for rotatably accommodating said ball (34) therein; and
   a dust boot (50) fitted on said ball shaft (35) to surround said ball shaft (35), said dust boot (50) having:
      at the side of said other member (5) and end portion fixedly attached to said housing (31); and
      at the side of said one member (12) an end portion formed with a seal lip (54) adapted to surround said ball shaft (35) and to come into elastic contact with said one member (12),
   wherein:
      said dust boot (50) has formed thereon a projected portion (53) surrounding said seal lip (54) and facing the side of said one member (12) so that a labyrinth (S) is defined between said projected portion (53) and said one member (12).

2. A ball joint according to claim 1, wherein said ball (34) is accommodated in said housing (31) so as to be rotatable about an axis line ($L_2$) of said ball shaft (35).

3. A ball joint according to claim 1, wherein:
   said one member (12) is formed with a recess (14) to have said projected portion (53) of said dust boot (50) fitted therein with a predetermined gap so that said labyrinth (S) is cooperatively defined by said recess (14) and said projected portion (53).

4. A ball joint according to claim 3, wherein:
   the whole circumference of said end portion at the side of said other member (5) of said dust boot (50) is fixedly attached to said housing (31);
   said seal lip (54) of said dust boot (50) is adapted to surround the whole circumference of said ball shaft (35); and said projected portion (53) of said dust boot (50) is adapted to surround the whole circumference of said seal lip (54).

5. A ball joint according to claim 4, wherein:
said seal lip (54) of said dust boot (50) is annular;
said projected portion (53) of said dust boot (50) is annular; and
said recess (14) of said one member (12) is annular.

6. A ball joint according to claim 1, wherein:
said dust boot (50) includes a core member (57) embedded in said projected portion (53).

7. A ball joint according to claim 1, wherein: said dust boot (50) further has on the inner circumference of an axially intermediate portion thereof two seal lips (51, 52) axially spaced apart from each other and adapted to come into elastic contact with the outer circumference of said ball shaft (35); and
at the outside of said two seal lips is provided a tightening spring (59).

8. A ball joint according to claim 1, wherein:
said ball shaft (35) is insreted to be fitted through said one member (12), and has a portion (37) thereof exposed over said one member (12) and covered with a cover (16).

* * * * *